L. INGLEE & C. M. HART.
VEHICLE WHEEL.
APPLICATION FILED AUG. 12, 1908.
934,178.
Patented Sept. 14, 1909.
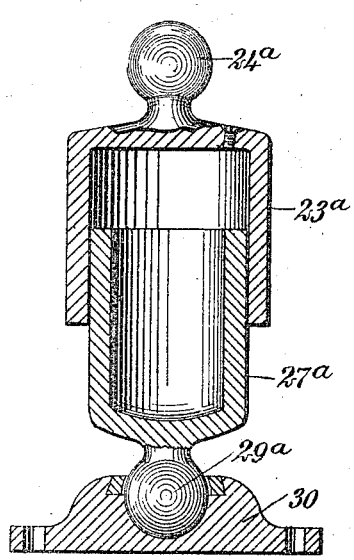
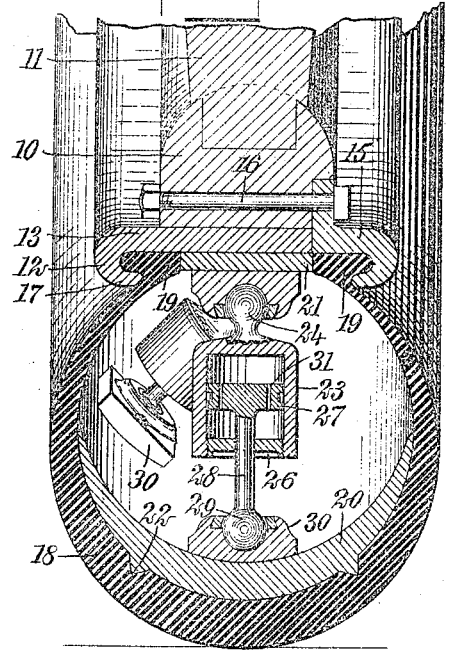
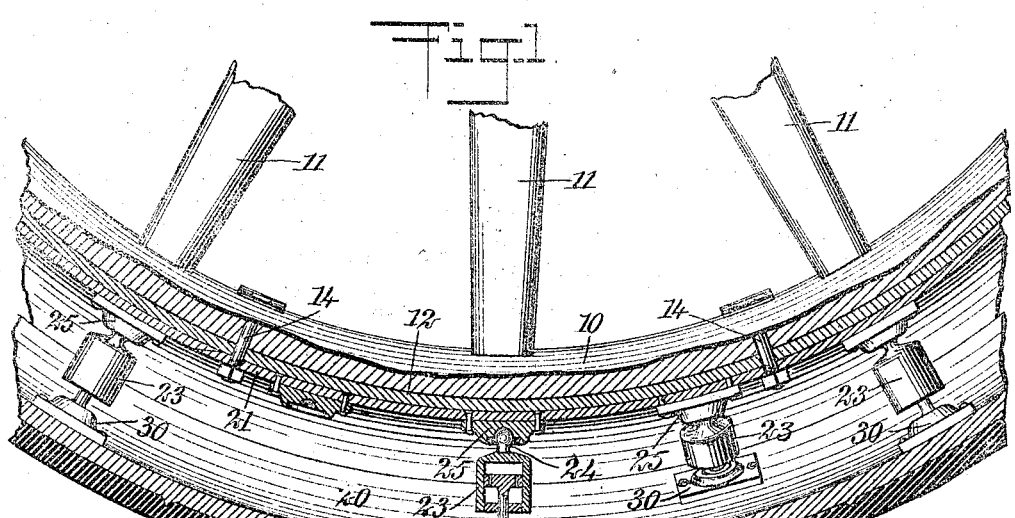
WITNESSES
INVENTORS
Lewis Inglee
Charles M. Hart
BY
ATTORNEYS

UNITED STATES PATENT OFFICE.

LEWIS INGLEE AND CHARLES M. HART, OF AMITYVILLE, NEW YORK.

VEHICLE-WHEEL.

934,178.

Specification of Letters Patent.   Patented Sept. 14, 1909.

Application filed August 12, 1908.   Serial No. 448,103.

*To all whom it may concern:*

Be it known that we, LEWIS INGLEE and CHARLES M. HART, both citizens of the United States, and residents of Amityville, in the county of Suffolk and State of New York, have invented a new and Improved Vehicle-Wheel, of which the following is a full, clear, and exact description.

This invention relates to certain improvements in vehicle wheels, and more particularly to a tire construction whereby the inner tube of an ordinary pneumatic tire may be eliminated and a substitute employed which will operate to support the wheel and hold the outer casing or shoe in its extended position. Our improved construction may be used with the ordinary felly and clencher rim, and in connection with the ordinary shoe or outer casing of the tire, without necessitating any changes in the latter.

Our invention consists in the provision of a plurality of cylinders and pistons within the tire, and so mounted and disposed as to resist not only pressure radially of the wheel, but also will resist side thrust or diagonal strain.

Reference is to be had to the acompanying drawings forming a part of this specification, in which drawings like characters of reference indicate like parts throughout the views, and in which—

Figure 1 is a side view of a portion of a wheel, the tire and rim being shown in section; Fig. 2 is a transverse section through the parts shown in Fig. 1, and upon a somewhat larger scale; and Fig. 3 is a longitudinal section on a still larger scale through a plunger which may be employed as a substitute for that shown in Figs. 1 and 2.

Our improved mechanism may be used in connection with a vehicle wheel having any suitable form of felly 10, secured to the outer ends of the spokes 11, and encircling the felly may be any suitable form of clencher rim 12. The rim may be secured in place in any suitable manner, but as shown it is formed of two sections, one a fixed section 13 rigidly bolted to the felly by radial bolts 14, the other a removable section 15 secured to the felly by transverse bolts 16. Each section is provided with an outwardly extending and inwardly turned flange 17 which serves to engage with the base flanges of the tire casing or shoe. In connection with the rim any form of outer tire casing or shoe 18 may be employed having the customary base flanges 19 for engagement with the flanges of the clencher rim to hold said shoe in place. So far as above described in detail the parts do not constitute any material portion of our invention and are all old in the art. In connection with these parts, instead of employing a pneumatic inner tube for holding the shoe against collapse, and to sustain the weight of the vehicle, we employ two steel rings 20 and 21, spaced apart by compressor members. The outer ring 20 is preferably substantially sector shaped in cross section, and its greatest width is substantially equal to the inner diameter of the shoe. The ring may if desired be provided with outwardly extending projections 22 which engage within openings or recesses in the inner surface of the shoe to prevent the shoe from slipping in respect to the ring. The inner ring 21 is of smaller diameter and is disposed closely adjacent the interior surface of the clencher rim. This ring is preferably spaced between the two base flanges 19 of the shoe and serves not only to support the connecting members between said rings, but also serves to space apart the base flanges 19 and hold them in engagement with the flanges of the clencher rim.

For spacing apart the two rings 20 and 21, but at the same time permitting of a limited amount of movement, we provide a plurality of pairs of compressor members, each pair having ball and socket connections with the opposed surfaces of the rings. In the specific form of compressor members illustrated in Figs. 1 and 2, one member is in the form of a cylinder 23, having its base in the form of a ball 24 and adapted to fit within a socket in a plate 25, riveted or otherwise rigidly secured to the ring 21. The outer end of each cylinder 23 is closed by a cylinder head 26, and within each cylinder is mounted the other member, which in this instance is in the form of a piston 27 connected to a piston rod 28 extending through the cylinder head 26 and terminating in a ball 29, which latter fits within a socket in a plate 30 riveted or otherwise rigidly secured to the inner surface of the outer ring 20. The plates 25 are all secured to the ring 21 in alinement with each other, so that all of the balls 24 lie in the same circumference, and all at equal distances from the opposite edges of the ring 21. The plates 30 are not all disposed in the same line, but each alternate one is disposed along the medial line of the ring 20, while the remaining ones are disposed alternately upon opposite sides of the medial line and adjacent the edges of the ring 20.

Each cylinder is preferably filled with oil, or other suitable fluid, and the pistons are so formed that the fluid may slowly escape from one side of the piston to the other as said piston moves longitudinally of the cylinder. Preferably each piston is provided with small apertures or passages 31 therethrough. In place of using the cylinder and piston construction illustrated in Figs. 1 and 2, we may employ two telescoping cylinders 23$^a$ and 27$^a$, each having an open end, and the open end of one cylinder being disposed within the open end of the other. The interiors of the two cylinders are in communication with each other, and the space is filled with any suitable fluid. The outer closed ends of the cylinders may be provided with balls 24$^a$ and 29$^a$, by means of which the device may be mounted within the sockets as in the form first described. As the wheel rotates, the weight is continuously transferred from one pair of telescopic members to the next, and within each there is a compression of the fluid and a corresponding movement of the rings 20 and 21 toward each other. In the form shown in Figs. 1 and 2 this movement is slightly greater, due to the bodily transfer of fluid through the passages 31.

The compressor members serve not only to hold the tire casing in proper form and support the vehicle, but as each alternate one has its axis at an angle to the plane of the wheel, said compressor members serve also to resist side thrusts and any corresponding lateral movement of the ring 20 in respect to the ring 21

The device may be readily attached to any vehicle wheel in place of the inner tube, and possesses substantially all of the advantages of a pneumatic tire, together with the added advantage of non-puncturability. The inner ring 21 may merely rest between the flanges 19, or may be secured in place by special bolts, or by the bolts 14 which hold the rim in place. If desired, the outer casing 18 together with the clencher rim may be left off and merely the rings 20 and 21 and their connecting compressor members be employed.

Having thus described our invention, what we claim as new and desire to secure by Letters Patent is:

1. A vehicle wheel having a rim, an outer casing secured to said rim along the opposite edges of the latter, two concentric rings within the casing, and a plurality of pairs of compressor members between said rings, one member of each of said pairs having ball and socket connections with the inner ring along the medial line thereof, and the other members of certain of said pairs having ball and socket connections with the outer ring upon opposite sides of the medial line thereof.

2. A vehicle wheel having a rim, two rings concentric therewith and spaced apart, a plurality of compressor members intermediate said rings, all of said compressor members having ball and socket connections with the inner of said rings along the medial line thereof, and certain of said members having engagement with the outer ring upon one side of the medial line, and certain other of said members having engagement with the outer ring upon the opposite side of the medial line.

3. A vehicle wheel having a rim, an outer casing secured to said rim along the opposite edges of the latter, two concentric rings within said casing, one of said rings serving to hold said casing in engagement with the edges of said rim, and a plurality of pairs of compressor members between said rings, one member of each of said pairs having ball-and-socket connections with the inner ring along the medial line thereof and the other members of certain of said pairs having ball-and-socket connections upon opposite sides of the medial line of the other ring, each of said ball-and-socket connections being formed by a ball integral with its respective member and a socket plate secured to the surface of the corresponding ring, said compressor members inclosing a fluid acted upon by relative movement of the members.

In testimony whereof we have signed our names to this specification in the presence of two subscribing witnesses.

LEWIS INGLEE.
CHAS. M. HART.

Witnesses:
GEORGE V. GREEY,
FREDERIC H. WELLS.